United States Patent
Zhu (10) Patent No.: US 12,017,681 B2
(45) Date of Patent: Jun. 25, 2024

(54) OBSTACLE PREDICTION SYSTEM FOR AUTONOMOUS DRIVING VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 16/817,948

(22) Filed: Mar. 13, 2020

(65) Prior Publication Data
US 2021/0284195 A1  Sep. 16, 2021

(51) Int. Cl.
| | |
|---|---|
| *B60W 60/00* | (2020.01) |
| *B60W 30/095* | (2012.01) |
| *B60W 40/04* | (2006.01) |
| *G06V 20/58* | (2022.01) |
| *H04W 4/40* | (2018.01) |

(52) U.S. Cl.
CPC .... *B60W 60/0011* (2020.02); *B60W 30/0956* (2013.01); *B60W 40/04* (2013.01); *B60W 60/00274* (2020.02); *G06V 20/58* (2022.01); *G06V 20/584* (2022.01); *H04W 4/40* (2018.02); *B60W 2552/45* (2020.02); *B60W 2554/4029* (2020.02)

(58) Field of Classification Search
CPC ....... B60W 60/0011; B60W 60/00274; B60W 30/0956; B60W 40/04; B60W 2554/4029; B60W 2552/45; H04W 4/40; G06K 9/00805; G06K 9/00825
See application file for complete search history.

(56) References Cited

U.S. PATENT DOCUMENTS

| | | | |
|---|---|---|---|
| 9,381,916 B1* | 7/2016 | Zhu | B60W 30/0956 |
| 10,168,702 B2* | 1/2019 | Kato | B60W 30/14 |
| 2012/0179358 A1* | 7/2012 | Chang | G01C 21/3815 |
| | | | 701/119 |
| 2015/0210312 A1* | 7/2015 | Stein | B60W 30/14 |
| | | | 701/41 |

(Continued)

FOREIGN PATENT DOCUMENTS

| | | |
|---|---|---|
| CN | 109429518 A | 3/2019 |
| CN | 109801508 A | 5/2019 |

(Continued)

*Primary Examiner* — Dale W Hilgendorf
*Assistant Examiner* — Frank T Glenn, III
(74) *Attorney, Agent, or Firm* — WOMBLE BOND DICKINSON (US) LLP (57) ABSTRACT

Embodiments of a system/method is disclosed to operate an autonomous driving vehicle (ADV). In one embodiment, a system perceives a driving environment surrounding the ADV using a plurality of sensors mounted on the ADV including one or more obstacles. The system receives traffic signal information from one or more traffic indicators identified within a predetermined radius of the ADV. For each of the one or more obstacles, the system determines if the obstacle is situated on a lane with traffic flow coordinated by the one or more traffic indicators. The system predicts a behavior of the obstacle based on the traffic signal information for the lane. The system plans a trajectory based on the predicted behaviors for the one or more obstacles to control the ADV based on the planned trajectory.

14 Claims, 8 Drawing Sheets

(56) References Cited

U.S. PATENT DOCUMENTS

| | | | |
|---|---|---|---|
| 2015/0316387 A1* | 11/2015 | Ichikawa | G05D 1/0276 |
| | | | 701/532 |
| 2016/0039420 A1* | 2/2016 | Tosaka | B60W 30/18027 |
| | | | 701/99 |
| 2016/0318490 A1* | 11/2016 | Ben Shalom | B60K 31/0008 |
| 2017/0197617 A1* | 7/2017 | Penilla | G08G 1/0129 |
| 2018/0112997 A1* | 4/2018 | Fasola | B60W 60/0011 |
| 2018/0120859 A1* | 5/2018 | Eagelberg | G08G 1/09623 |
| 2019/0049970 A1* | 2/2019 | Djuric | G05D 1/0088 |
| 2019/0259282 A1* | 8/2019 | Ji | G08G 1/096783 |
| 2019/0344791 A1* | 11/2019 | Kim | B60W 30/18018 |
| 2019/0369643 A1* | 12/2019 | Jeon | B60W 60/0053 |
| 2019/0385457 A1* | 12/2019 | Kim | G08G 1/166 |
| 2019/0392715 A1* | 12/2019 | Strauß | G08G 1/22 |
| 2020/0135030 A1* | 4/2020 | Krivokon | G06V 20/588 |

FOREIGN PATENT DOCUMENTS

| | | |
|---|---|---|
| CN | 109976355 A | 7/2019 |
| CN | 110199336 A | 9/2019 |
| JP | 2019096056 A | 6/2019 |

* cited by examiner

| Traffic Indicator Identifier | Lane Identifier |
|---|---|
| 500 | 520, 521 |
| 502 | 522, 523 |
| 504 | 524, 525 |
| 506 | 526, 527 |
| 509 | 529 |
| 530 | 524, 525, 531, 532 |

FIG. 6A

| Traffic Indicator Identifier | Obstacle Identifier |
|---|---|
| 500 | |
| 502 | |
| 504 | 515 |
| 506 | |
| 509 | 513 |
| 530 | 511 |

OBSTACLE PREDICTION SYSTEM FOR AUTONOMOUS DRIVING VEHICLES

TECHNICAL FIELD

Embodiments of the present disclosure relate generally to operating autonomous vehicles. More particularly, embodiments of the disclosure relate to an obstacle prediction system using vehicle-to-everything V2X communication for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

V2X is usually used to provide an ADV with traffic signal information about a current lane of driving for the ADV. The ADV can predict behaviors of obstacles based on perceived historical locations/speeds of the obstacles using its sensor system. However, the prediction is limited to observations made by the sensors system.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of a system/method is disclosed to operate an autonomous driving vehicle (ADV). In one embodiment, a system perceives a driving environment surrounding the ADV using a plurality of sensors mounted on the ADV including one or more obstacles. The system receives traffic signal information from one or more traffic indicators identified within a predetermined radius or proximity of the ADV. For each of the one or more obstacles, the system determines if the obstacle is situated on a lane with traffic flow coordinated by the one or more traffic indicators. The system predicts a behavior of the obstacle based on the traffic signal information for the lane. The system plans a trajectory based on the predicted behaviors for the one or more obstacles to control the ADV based on the planned trajectory.

Figure 1:
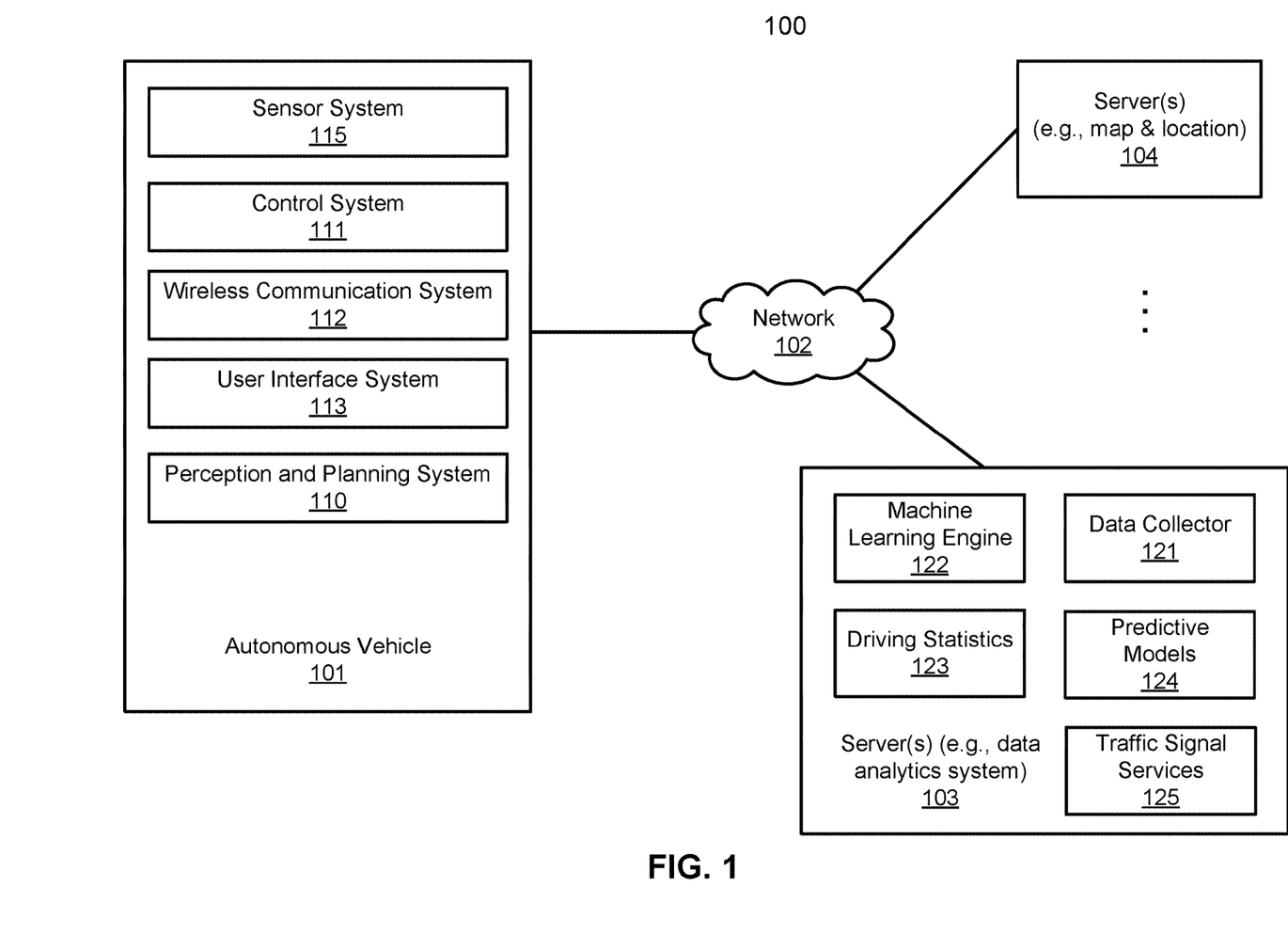
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
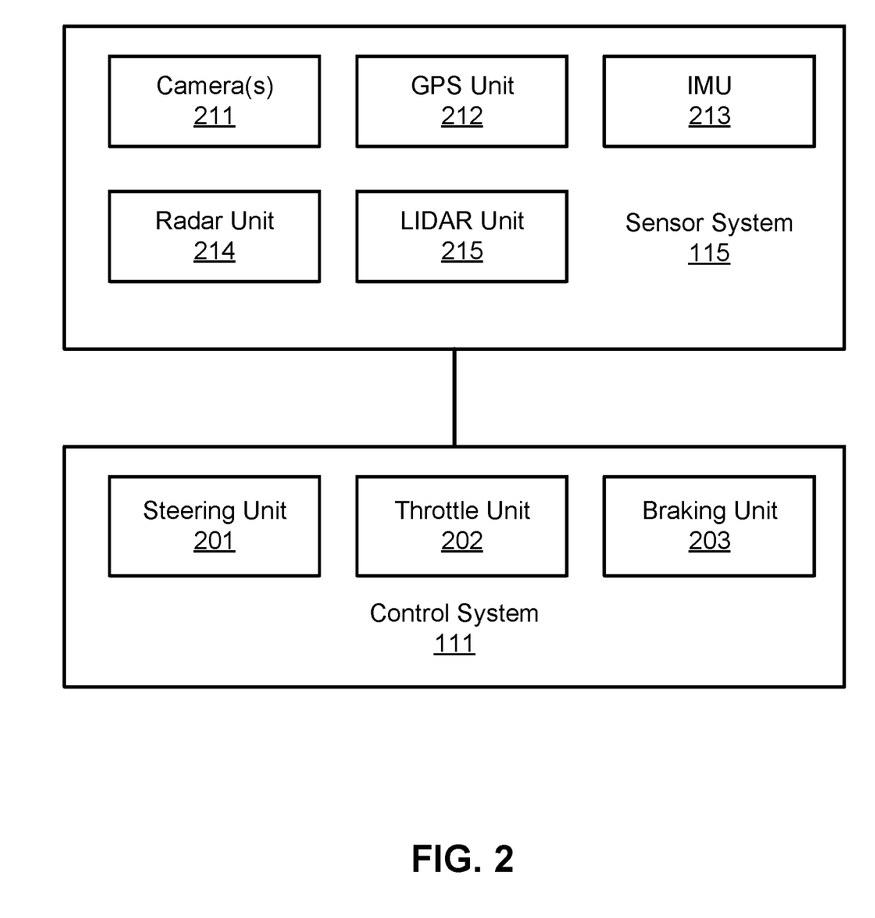
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, weather conditions, and road conditions, such as slow traffic on freeway, stopped traffic, car accident, road construction, temporary detour, unknown obstacles, etc.

Based on driving statistics 123, machine learning engine 122 generates or trains a set of rules, algorithms, and/or predictive models 124 for a variety of purposes, including models map a road lane to a traffic light signal. Models 124 can also include a prediction model to predict how an obstacle will likely to behave (e.g., move forward, reverse, standstill, turn left or turn right) in view of a traffic light signal for a corresponding road lane in which the obstacle is located. Algorithms/models 124 can then be uploaded onto ADVs to be utilized during autonomous driving in real-time.

Traffic signal service 125 may communicate with ADVs wirelessly via an application programming interface (API) for the ADVs to request and receive traffic signal information for traffic lights in an immediate surrounding environment of the ADV. In another embodiment, the ADVs can communicate directly, via a network, with the one or more traffic lights. The communication may be a vehicle-to-everything V2X communication. Here, V2X communication includes, but is not limited to, vehicle to network, vehicle to infrastructure, vehicle to vehicle, vehicle to pedestrian, vehicle to devices, vehicle to grid, etc. communication.

Figure 3A:
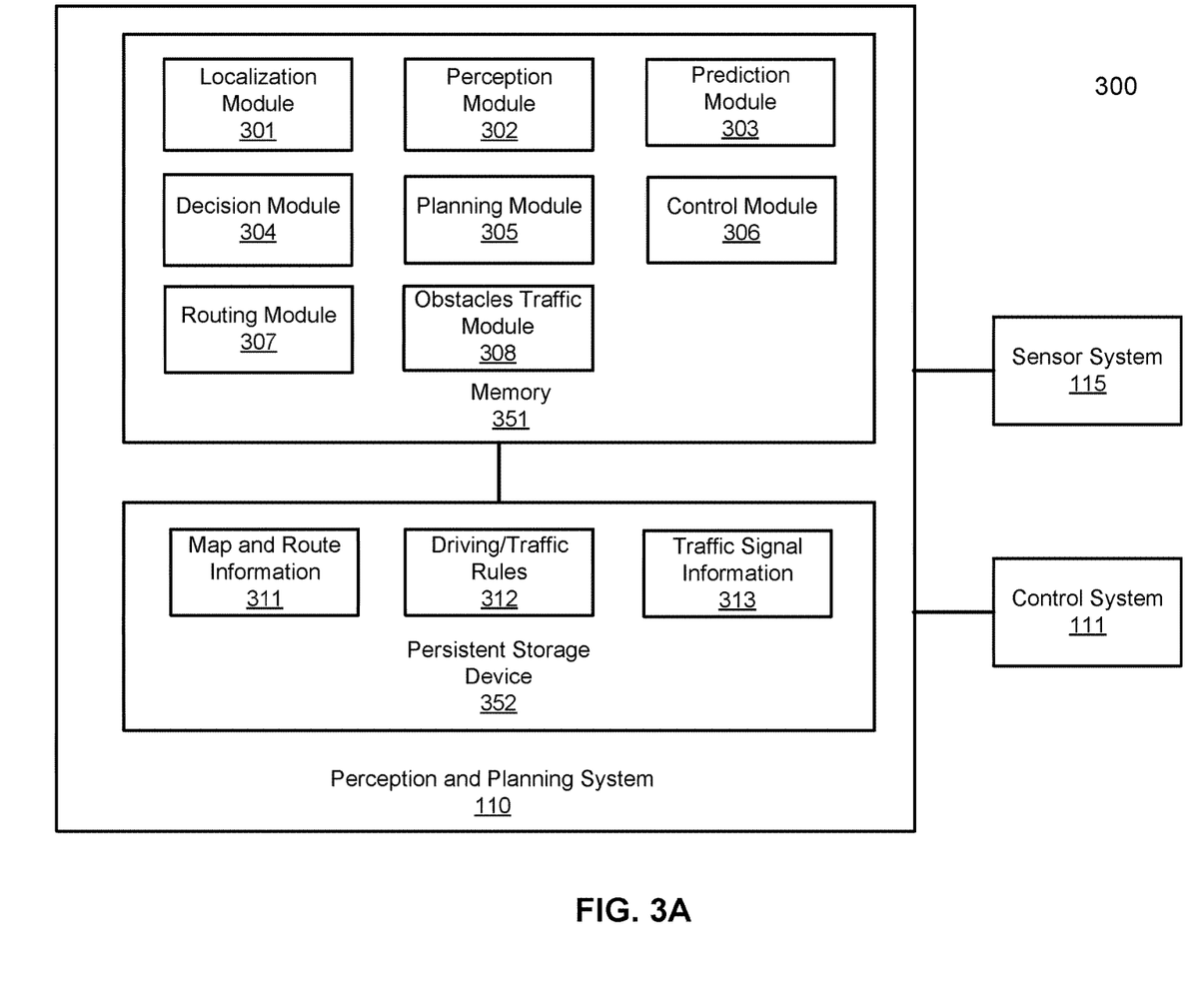
FIGS. 3A-3B are block diagrams illustrating an example of a perception and planning system used with an autonomous vehicle according to one embodiment.
Figure 3B:
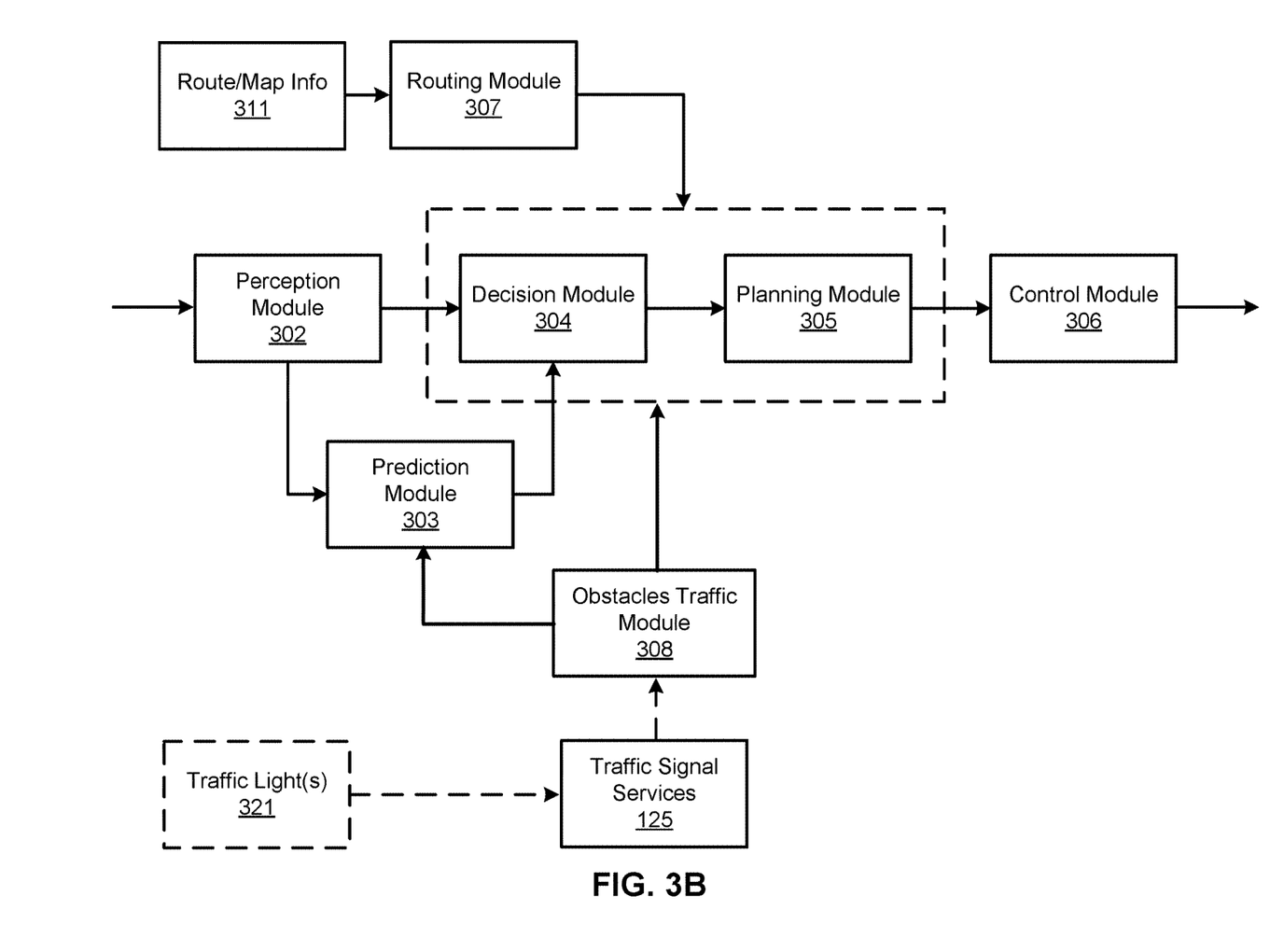

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and obstacles traffic module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to entering the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 4:
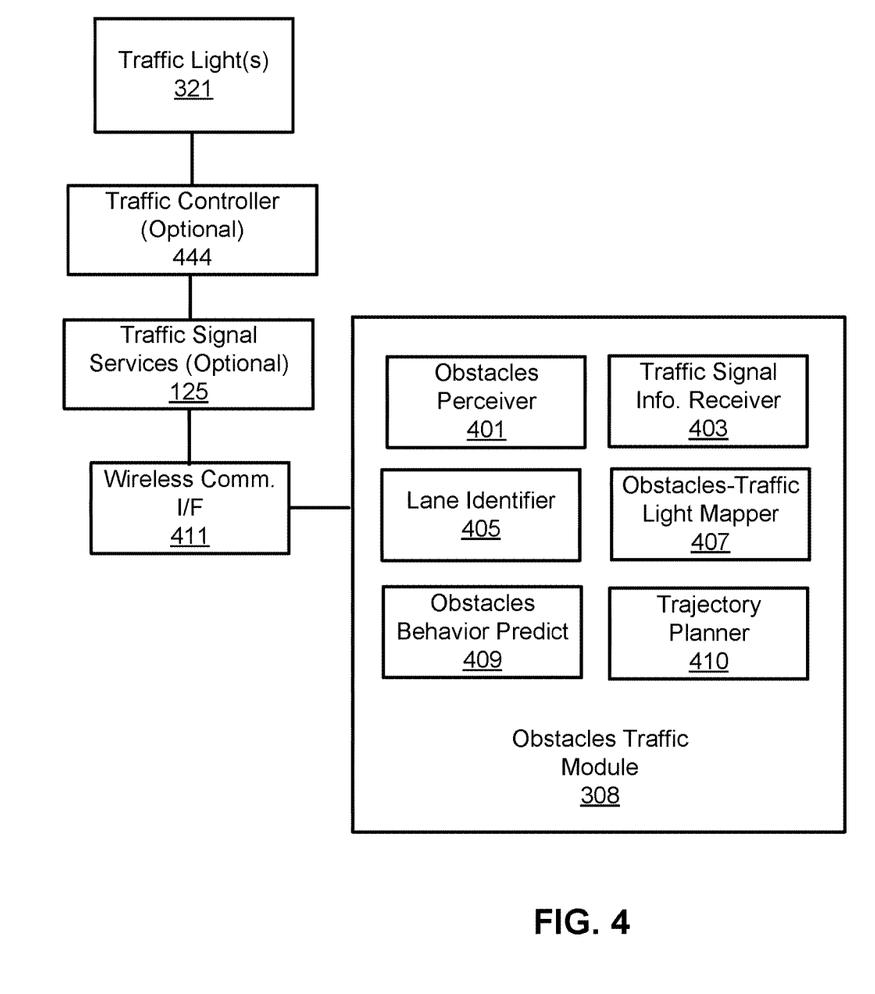
FIG. 4 is a block diagram illustrating an example of a V2X obstacles module according to one embodiment.

FIG. 4 is a block diagram illustrating an example of an obstacles traffic module according to one embodiment. Referring to FIG. 4, obstacles traffic module 308 can be coupled to wireless communication interface 411 to request and receive traffic signal information from a traffic signal service, such as traffic signal service 125 of FIG. 1. In another embodiment, the traffic signal information of traffic signal service 125 may be provided by a third party traffic controller 444. In another embodiment, obstacles traffic module 308 can communicate directly with surrounding signal infrastructures and/or devices (e.g., traffic lights 321) to obtain the traffic signal information. Obstacles traffic module 308 can include submodules such as obstacles perceiver 401, traffic signal information receiver 403, lane identifier 405, obstacles-traffic light mapper 407, obstacle behavior predict 409, and trajectory planner 410.

Obstacles perceiver 401 can perceive obstacles surround the ADV. The obstacles can be perceived by any sensors equipped by the ADV including, but not limited to, LIDAR, RADAR, color cameras, time-of-flight cameras, etc. Traffic signal information receiver 403 can receive traffic signal information for a particular traffic light. Traffic signal information can for a particular traffic light can include a traffic light identifier, a location, a current light indicator color, a timing of current light indicator color, and a timing to a next light indicator color for the respective traffic light. Lane identifier 405 can identify a road lane for a perceived obstacle. Obstacles-traffic light mapper 407 can map a traffic light to a particular obstacle based on a geographical location of the obstacle. Obstacle behavior predict 409 can predict a next behavior of a particular obstacle. Here, the obstacles can be another vehicle, a motorcycle, a pedestrian, a bike/scooter, etc. Trajectory planner 410 can plan a trajectory (a timed path) for the ADV based on the obstacle behavior predictions for obstacles predicted to be near a path of the ADV. Here, the path of the ADV can be planned by identifying a current lane of the ADV and generating a trajectory for the ADV based on the current lane.

Figure 5:
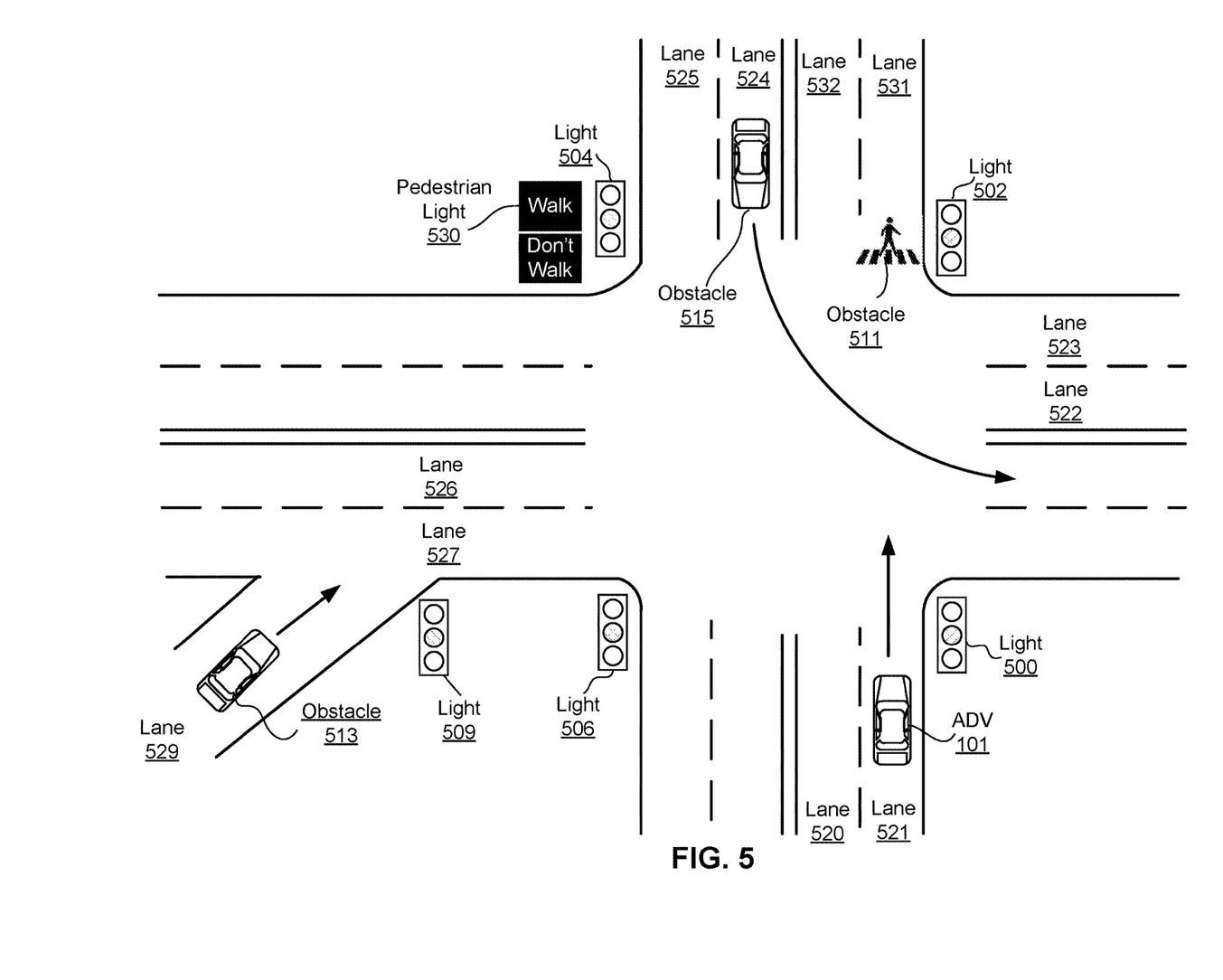
FIG. 5 is a block diagram illustrating an example of a scenario where an ADV predicts behaviors of obstacles according to one embodiment.

FIG. 5 is a block diagram illustrating an example of a scenario where an ADV predicts behaviors of obstacles according to one embodiment. Referring to FIG. 5, in this scenario, ADV 101 is approaching a road intersection, where the road intersection can include one or more traffic lights 500-506, and one or more pedestrian lights 531.

In one embodiment, ADV 101 perceives obstacles 511, 513, and 515 and predicts these obstacles can cross or come close to a planning trajectory of ADV 101. In one embodiment, ADV obtains traffic signal information from a traffic signal service or the traffic lights infrastructure. The information can be for traffic lights within a threshold radius or proximity of ADV 101, e.g., 200-300 meters. In this case, the traffic signal information received can be information for traffic lights 500, 502, 504, 506, 509, and 530. Note that traffic light 509 is a traffic light for a merge lane and light 530 is a traffic light for a pedestrian walkway.

Figure 6A:
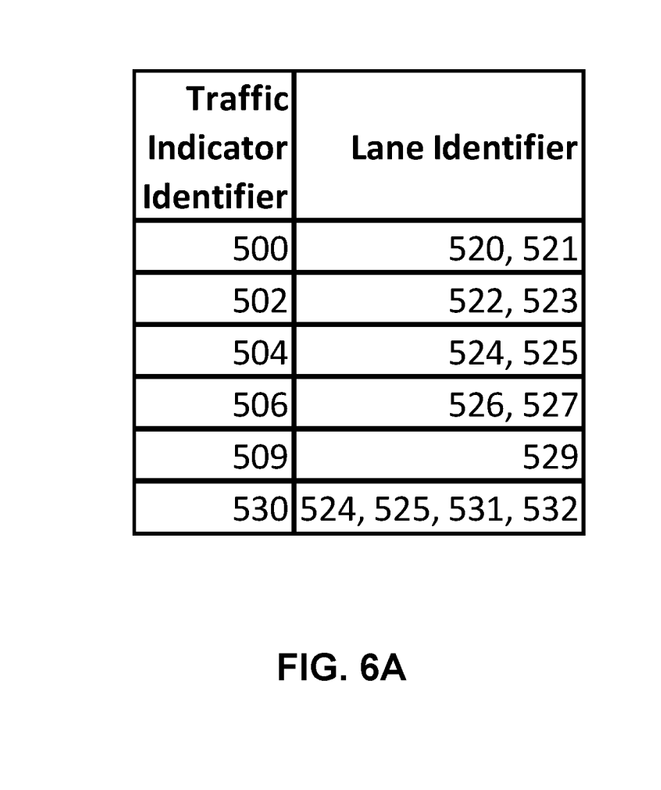
FIG. 6A illustrates an example traffic indicators-lanes mapping according to one embodiment.

Next, ADV 101 retrieves map and route information, e.g., map and route information 311 of FIG. 3A. The map and route information can include mappings for traffic lights/indicators (e.g., traffic indicator identifiers) mapped to lanes (e.g., lane identifiers). FIG. 6A illustrates an example traffic indicators-lanes mapping. Note that a lane can correspond to one or more indicator lights.

Figure 6B:
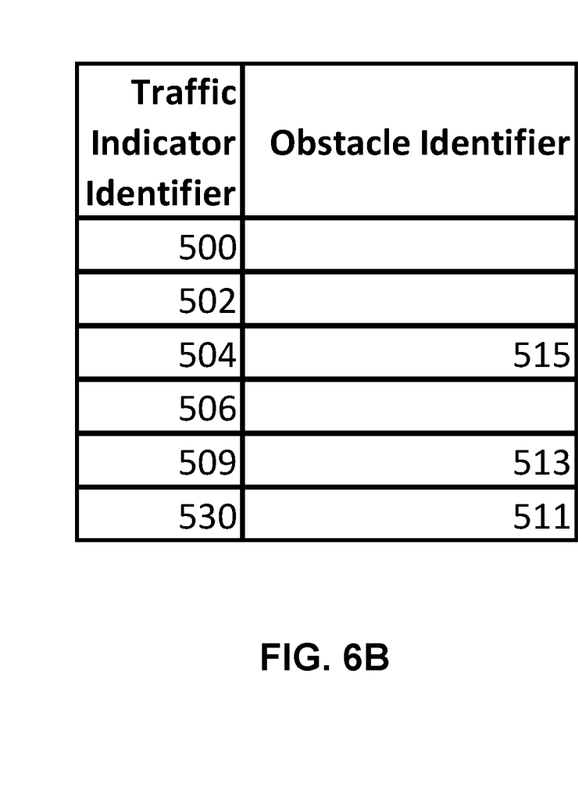
FIG. 6B illustrates an example traffic indicators-obstacles mapping according to one embodiment.

Referring to FIG. 5 and FIG. 6A, light 500 is mapped to lanes 520, 521; light 502 is mapped to lanes 522, 523; light 504 is mapped to lanes 524, 525; light 506 is mapped to lanes 526, 527; light 509 is mapped to lane 529; and light 530 is mapped to lanes 524, 525, 531, and 532. Based on the lights/indicators-lanes mappings, ADV can generate a real-time traffic lights/indicators-obstacles mapping based on a perceived geographical location of the obstacle. For example, if obstacle 515 is perceived to be on lane 524 then obstacle 515 is mapped to light 504, if obstacle 513 is perceived to be on lane 529 then obstacle 513 is mapped to light 509, and if obstacle 511 is perceived to be on lane 531 then obstacle 511 is mapped to light 530. An example for a traffic indicators-obstacles mapping is illustrated in FIG. 6B. Note that the traffic indicators-obstacles is updated in real-time and a particular obstacle can correspond to one or more traffic indicators/lights.

Based on the real-time traffic indicators-obstacles mapping, ADV can predict a behavior of an obstacle based on the real-time traffic signal information for one or more particular traffic signal(s) corresponding to the obstacle. For example, ADV can predict a probability for an event that obstacle 513 will proceed through lane 529 and lane 527 based on the signal indicator colors of lights 509 and 506. For example, if both lights 509 and 506 are green, with a current signal timing well above the time required to proceed, ADV would predict obstacle 513 will enter lane 527 and cross the intersection.

A similar prediction can be made for obstacles 511 and 515. For example, if pedestrian light 530 signals walk (or green), obstacle 511 is predicted to cross lanes 524-525, and lanes 531-532. If obstacle 515 is on lane 524, a current indicator indicating left turn is allowed, ADV can predict obstacle 515 will proceed to turn left. Based on the predictions, ADV 101 can plan a trajectory and control ADV 101 using the planned trajectory to avoid the obstacles. Although FIG. 5 only includes obstacles types pedestrians and vehicles, other types of obstacles are possible.

Figure 7:
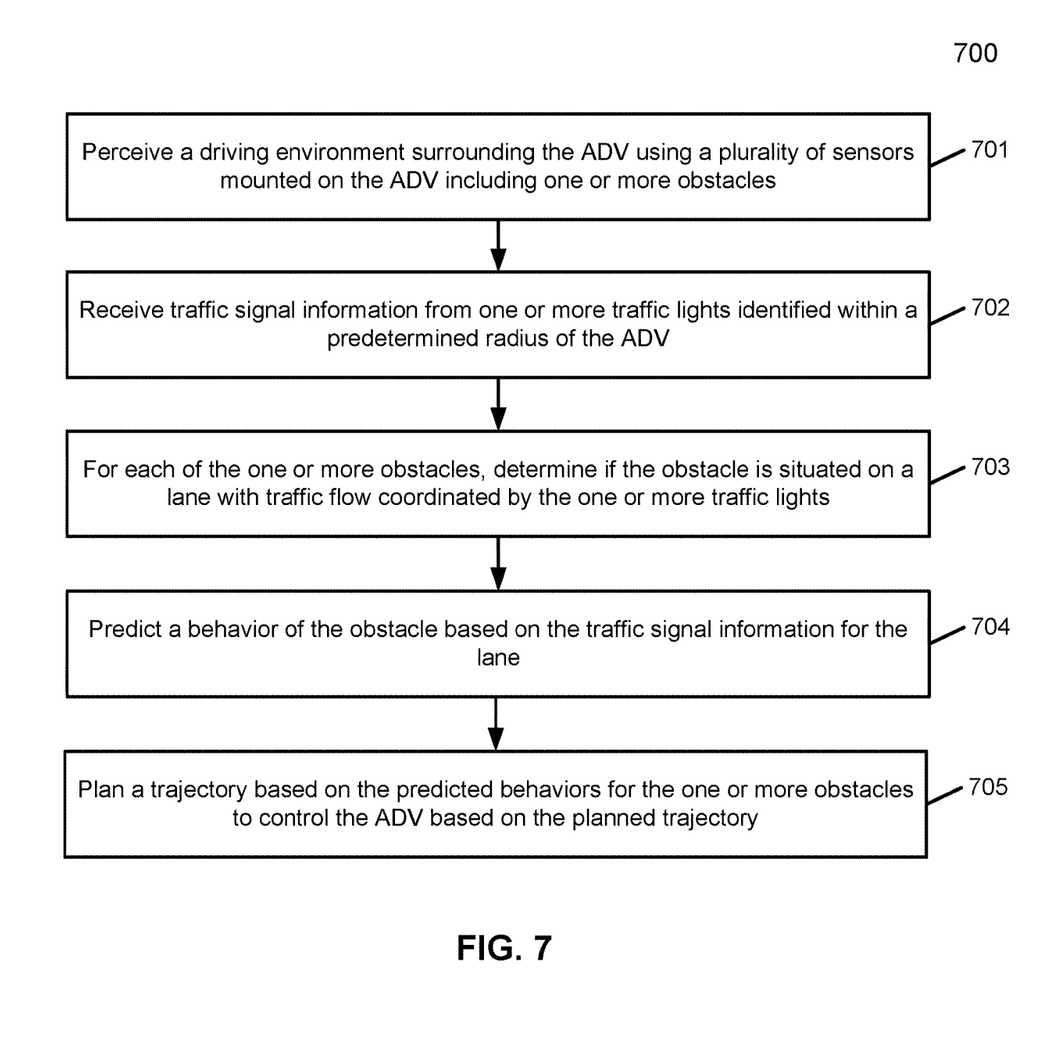
FIG. 7 is a flow diagram illustrating a method performed by an ADV according to one embodiment.

FIG. 7 is a flow diagram illustrating a method performed by an ADV according to one embodiment. Processing 700 may be performed by processing logic which may include software, hardware, or a combination thereof. For example, process 700 may be performed by obstacles traffic module 308 of FIG. 4. Referring to FIG. 7, at block 701, processing logic perceives a driving environment surrounding the ADV using a plurality of sensors mounted on the ADV including one or more obstacles. At block 702, processing logic receives traffic signal information from one or more traffic lights identified within a predetermined proximity of the ADV. At block 703, for each of the one or more obstacles, processing logic determines if the obstacle is situated on a lane with traffic flow coordinated by the one or more traffic lights. At block 704, processing logic predicts a behavior of the obstacle based on the traffic signal information for the lane. At block 705, processing logic plans a trajectory based on the predicted behaviors for the one or more obstacles to control the ADV based on the planned trajectory.

In one embodiment, determining if the obstacle is situated on a lane with traffic flow coordinated by the one or more traffic lights includes for each of the one or more traffic lights, determining one or more lanes with a traffic flow controlled by the traffic light based on map information; identifying a lane for the obstacle based on a location of the obstacle in view of the map information; and determining if the identified lane matches any of the one or more lanes. In one embodiment, predicting a behavior of the obstacle based on the traffic signal information for the lane includes determining a traffic light for the lane has a green indicator color and determining the obstacle is to proceed through the traffic light, and determining the traffic light for the lane has a red indicator color and determining the obstacle is to stop before the traffic light.

In one embodiment, the traffic signal information comprises a traffic light identifier, a location, a current light indicator color, a timing of current light indicator color, and a timing to a next light indicator color. In one embodiment, processing logic further identifies a lane that the ADV is situated on based on the map information, determines a traffic flow for the lane based on the received traffic signal information for the lane, and plans the trajectory based on the traffic flow for the lane and the predicted behaviors of the one or more obstacles.

In one embodiment, the traffic signal information is received by the ADV via vehicle-to-anything (V2X) communication. In one embodiment, an obstacle includes a vehicle and the traffic light is a vehicle traffic light, or the obstacle includes a pedestrian and the traffic light is a pedestrian walkway light.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
    perceiving a driving environment surrounding the ADV using a plurality of sensors mounted on the ADV including one or more obstacles;
    receiving, by a vehicle-to-anything (V2X) sensor, traffic signal information from one or more traffic indicators identified within a predetermined proximity of the ADV via direct V2X communication between the V2X sensor and the one or more traffic indicators, wherein the one or more traffic indicators include a vehicle traffic indicator and a pedestrian walkway indicator;
    generating a real-time indicators-obstacles mapping based on an indicators-lanes mapping associated with one or more lanes, wherein the indicators-obstacles mapping maps identifiers of the one or more traffic indicators to identifiers of the one or more obstacles, wherein the indicators-lanes mapping maps identifiers of the one or more traffic indicators to identifiers of the one or more lanes, wherein the indicators-lanes mapping comprises a plurality of record pairs, each record pair comprises two entries having a first entry for an identifier of a traffic indicator and a second entry for a plurality of identifiers corresponding to a plurality of lanes with a traffic flow,
    for each of the one or more obstacles,
        determining one or more lanes with a traffic flow controlled by the traffic indicator based on map information,
        identifying a lane for the obstacle based on a location of the obstacle in view of the map information,
        determining if the identified lane matches any of the one or more lanes,
        in response to determining the obstacle is situated on a lane with a traffic flow coordinated by a traffic indicator, mapping the obstacle to the traffic indicator using the indicators-obstacles mapping, and
        predicting a behavior of the obstacle based on the traffic signal information of the traffic indicator corresponding to the obstacle, wherein the obstacle includes a vehicle or a pedestrian, and the behavior of the obstacle corresponds to a probability for a prediction that the obstacle crosses the lane if the obstacle is identified as a pedestrian or a probability for a prediction that the obstacle proceeds through the lane, turns left, or turns right at an intersection of the lane if the obstacle is identified as a vehicle;
    identifying a lane that the ADV is situated on based on the map information;
    determining a traffic flow for the lane of the ADV based on the received traffic signal information for the lane; and
    planning a trajectory based on the predicted behaviors for the one or more obstacles and the traffic flow for the lane of the ADV to control the ADV based on the planned trajectory.

2. The computer-implemented method of claim 1, wherein predicting a behavior of the obstacle based on the traffic signal information for the lane comprises:
    determining a traffic indicator for the lane has a green indicator color and determining the obstacle is to proceed through the traffic indicator, or
    determining the traffic indicator for the lane has a red indicator color and determining the obstacle is to stop before the traffic indicator.

3. The computer-implemented method of claim 1, wherein the traffic signal information comprises a traffic indicator identifier, a location, a current light indicator color, a timing of current light indicator color, and a timing to a next light indicator color.

4. The computer-implemented method of claim 1, wherein an obstacle comprises a vehicle and the traffic indicator is a vehicle traffic indicator, or the obstacle comprises a pedestrian and the traffic indicator is a pedestrian walkway indicator.

5. The method of claim 1, wherein the behavior of the obstacle corresponds to a probability for a prediction that the obstacle crosses the lane if the obstacle is identified as a pedestrian, and a probability for a prediction that the obstacle proceeds through the lane, turns left, or turns right at an intersection of the lane if the obstacle is identified as a vehicle.

6. The method of claim 1, wherein the indicators-obstacles mapping comprises a plurality of record pairs, each record pair comprises an identifier of a traffic indicator and one or more identifiers corresponding to one or more obstacles.

7. A non-transitory machine-readable medium having instructions stored therein, which when executed by one or more processors, cause the one or more processors to perform operations of operating an autonomous driving vehicle (ADV), the operations comprising:

perceiving a driving environment surrounding the ADV using a plurality of sensors mounted on the ADV including one or more obstacles;

receiving, by a vehicle-to-anything (V2X) sensor, traffic signal information from one or more traffic indicators identified within a predetermined proximity of the ADV via direct V2X communication between the V2X sensor and the one or more traffic indicators, wherein the one or more traffic indicators include a vehicle traffic indicator and a pedestrian walkway indicator;

generating a real-time indicators-obstacles mapping based on an indicators-lanes mapping associated with one or more lanes, wherein the indicators-obstacles mapping maps identifiers of the one or more traffic indicators to identifiers of the one or more obstacles, wherein the indicators-lanes mapping maps identifiers of the one or more traffic indicators to identifiers of the one or more lanes, wherein the indicators-lanes mapping comprises a plurality of record pairs, each record pair comprises two entries having a first entry for an identifier of a traffic indicator and a second entry for a plurality of identifiers corresponding to a plurality of lanes with a traffic flow, for each of the one or more obstacles,
determining one or more lanes with a traffic flow controlled by the traffic indicator based on map information,
identifying a lane for the obstacle based on a location of the obstacle in view of the map information,
determining if the identified lane matches any of the one or more lanes, in response to determining the obstacle is situated on a lane with a traffic flow coordinated by a traffic indicator, mapping the obstacle to the traffic indicator using the indicators-obstacles mapping, and
predicting a behavior of the obstacle based on the traffic signal information of the traffic indicator corresponding to the obstacle, wherein the obstacle includes a vehicle or a pedestrian, and the behavior of the obstacle corresponds to a probability for a prediction that the obstacle crosses the lane if the obstacle is identified as a pedestrian or a probability for a prediction that the obstacle proceeds through the lane, turns left, or turns right at an intersection of the lane if the obstacle is identified as a vehicle;

identifying a lane that the ADV is situated on based on the map information;

determining a traffic flow for the lane of the ADV based on the received traffic signal information for the lane; and planning a trajectory based on the predicted behaviors for the one or more obstacles and the traffic flow for the lane of the ADV to control the ADV based on the planned trajectory.

8. The non-transitory machine-readable medium of claim 7, wherein predicting a behavior of the obstacle based on the traffic signal information for the lane comprises:

determining a traffic indicator for the lane has a green indicator color and determining the obstacle is to proceed through the traffic indicator, or determining the traffic indicator for the lane has a red indicator color and determining the obstacle is to stop before the traffic indicator.

9. The non-transitory machine-readable medium of claim 7, wherein the traffic signal information comprises a traffic indicator identifier, a location, a current light indicator color, a timing of current light indicator color, and a timing to a next light indicator color.

10. The non-transitory machine-readable medium of claim 7, wherein an obstacle comprises a vehicle and the traffic indicator is a vehicle traffic indicator, or the obstacle comprises a pedestrian and the traffic indicator is a pedestrian walkway indicator.

11. A data processing system, comprising:
one or more processors; and
a memory coupled to the one or more processors to store instructions, which when executed by the one or more processors, cause the one or more processors to perform operations of operating an autonomous driving vehicle (ADV), the operations including perceiving a driving environment surrounding the ADV using a plurality of sensors mounted on the ADV including one or more obstacles;

receiving, by a vehicle-to-anything (V2X) sensor, traffic signal information from one or more traffic indicators identified within a predetermined proximity of the ADV via direct V2X communication between the V2X sensor and the one or more traffic indicators, wherein the one or more traffic indicators include a vehicle traffic indicator and a pedestrian walkway indicator;

generating a real-time indicators-obstacles mapping based on an indicators-lanes mapping associated with one or more lanes, wherein the indicators-obstacles mapping maps identifiers of the one or more traffic indicators to identifiers of the one or more obstacles, wherein the indicators-lanes mapping maps identifiers of the one or more traffic indicators to identifiers of the one or more lanes, wherein the indicators-lanes mapping comprises a plurality of record pairs, each record pair comprises two entries having a first entry for an identifier of a traffic indicator and a second entry for a plurality of identifiers corresponding to a plurality of lanes with a traffic flow, for each of the one or more obstacles,
determining one or more lanes with a traffic flow controlled by the traffic indicator based on map information,
identifying a lane for the obstacle based on a location of the obstacle in view of the map information,
determining if the identified lane matches any of the one or more lanes,
in response to determining the obstacle is situated on a lane with a traffic flow coordinated by a traffic indicator, mapping the obstacle to the traffic indicator using the indicators-obstacles mapping, and
predicting a behavior of the obstacle based on the traffic signal information of the traffic indicator corresponding to the obstacle, wherein the obstacle includes a vehicle or a pedestrian, and the behavior of the obstacle corresponds to a probability for a prediction that the obstacle crosses the lane if the obstacle is identified as a pedestrian or a probability for a prediction that the obstacle proceeds through the lane, turns left, or turns right at an intersection of the lane if the obstacle is identified as a vehicle;

identifying a lane that the ADV is situated on based on the map information;

determining a traffic flow for the lane of the ADV based on the received traffic signal information for the lane; and planning a trajectory based on the predicted behaviors for the one or more obstacles and the traffic flow for the lane of the ADV to control the ADV based on the planned trajectory.

12. The system of claim 11, wherein predicting a behavior of the obstacle based on the traffic signal information for the lane comprises:

determining a traffic indicator for the lane has a green indicator color and determining the obstacle is to proceed through the traffic indicator, or determining the traffic indicator for the lane has a red indicator color and determining the obstacle is to stop before the traffic indicator.

13. The system of claim 11, wherein the traffic signal information comprises a traffic indicator identifier, a location, a current light indicator color, a timing of current light indicator color, and a timing to a next light indicator color.

14. The system of claim 11, wherein an obstacle comprises a vehicle and the traffic indicator is a vehicle traffic indicator, or the obstacle comprises a pedestrian and the traffic indicator is a pedestrian walkway indicator.

* * * * *